United States Patent
Chen

(10) Patent No.: US 11,455,811 B2
(45) Date of Patent: Sep. 27, 2022

(54) SYSTEM AND METHOD FOR VERIFYING AUTHENTICITY OF AN ANTI-COUNTERFEITING ELEMENT, AND METHOD FOR BUILDING A MACHINE LEARNING MODEL USED TO VERIFY AUTHENTICITY OF AN ANTI-COUNTERFEITING ELEMENT

(71) Applicant: Check it out Co., Ltd., Taoyuan (TW)

(72) Inventor: Ying-Jen Chen, Taoyuan (TW)

(73) Assignee: CHECK IT OUT CO., LTD., Taoyuan (TW)

( * ) Notice: Subject to any disclaimer, the term of this patent is extended or adjusted under 35 U.S.C. 154(b) by 88 days.

(21) Appl. No.: 17/006,454

(22) Filed: Aug. 28, 2020

(65) Prior Publication Data
US 2022/0067366 A1   Mar. 3, 2022

(51) Int. Cl.
| | | |
|---|---|---|
| G06K 9/00 | (2022.01) | |
| G06V 20/80 | (2022.01) | |
| G06N 3/08 | (2006.01) | |
| G06K 9/62 | (2022.01) | |
| G06V 20/00 | (2022.01) | |

(52) U.S. Cl.
CPC ............ *G06V 20/80* (2022.01); *G06K 9/6256* (2013.01); *G06K 9/6262* (2013.01); *G06K 9/6269* (2013.01); *G06N 3/08* (2013.01); *G06V 20/95* (2022.01)

(58) Field of Classification Search
CPC ............ G06K 9/00577; G06K 9/6256; G06K 9/6262; G06K 9/6269; G06K 2009/0059; G06N 3/08

USPC .......................................................... 382/159
See application file for complete search history.

(56) References Cited

U.S. PATENT DOCUMENTS

| | | | | |
|---|---|---|---|---|
| 2019/0156151 | A1* | 5/2019 | Wrenninge | .......... G06K 9/6256 |
| 2019/0236614 | A1* | 8/2019 | Burgin | .................. G06T 3/4076 |
| 2019/0370608 | A1* | 12/2019 | Lee | ........................ G06T 3/4053 |
| 2020/0193269 | A1* | 6/2020 | Park | ...................... G06K 9/6271 |
| 2021/0209388 | A1* | 7/2021 | Ciftci | .................... G06K 9/6273 |
| 2021/0365744 | A1* | 11/2021 | Navarrete Michelini | .................... G06N 3/0472 |

OTHER PUBLICATIONS

Huang, "Application of Locally Connected Spiking Neural Network in Image Processing" Oct. 2019 IEEE 13th International Conference on Anti-counterfeiting, Security, and Identification (ASID) Year: 2019. (Year: 2019).*

(Continued)

*Primary Examiner* — Juan A Torres
(74) *Attorney, Agent, or Firm* — Birch, Stewart, Kolasch & Birch, LLP

(57) ABSTRACT

A system for verifying authenticity of an anti-counterfeiting element includes a model building module and a verifying module. The model building module has a pre-processing sub-module for receiving original images of a same reference element and for making adjustments to the original images to form a plurality of true-element images. A training sub-module trains a deep neural network based on the true-element images to build a machine learning model. The verifying module obtains images of the anti-counterfeiting element, and inputs the images into the machine learning model to determine whether the anti-counterfeiting element is authentic or unauthentic.

14 Claims, 5 Drawing Sheets

(56) References Cited

OTHER PUBLICATIONS

Hashmi, "An Exploratory Analysis on Visual Counterfeits Using Conv-LSTM Hybrid Architecture", May 2020 (Year: 2020).*
Zheng, "Classification of Arc Welding Joints Images Based on Convolutional Neural Network" Apr. 2018 12th IEEE International Conference on Anti-counterfeiting, Security, and Identification (ASID). (Year: 2018).*
Guo, "Classification of Thyroid Ultrasound Standard Plane Images using ResNet-18 Networks" Oct. 2019 IEEE 13th International Conference on Anti-counterfeiting, Security, and Identification (ASID). (Year: 2019).*
Shen, "An Improved Binarized Weight Classification Network" Nov. 2018 12th IEEE International Conference on Anti-counterfeiting, Security, and Identification (ASID). (Year: 2018).*

* cited by examiner

SYSTEM AND METHOD FOR VERIFYING AUTHENTICITY OF AN ANTI-COUNTERFEITING ELEMENT, AND METHOD FOR BUILDING A MACHINE LEARNING MODEL USED TO VERIFY AUTHENTICITY OF AN ANTI-COUNTERFEITING ELEMENT

FIELD

The disclosure relates to a system and a method for verifying authenticity of an anti-counterfeiting element.

BACKGROUND

To prevent counterfeiting, most products, banknotes or other objects of value are provided with anti-counterfeiting elements, such as holographic security labels or stickers, optically variable ink patterns, security threads, and embroidered symbols. It is of particular significance that a holographic security label or sticker, or an optically variable ink pattern may present different visual effects when viewed from different angles and cannot be duplicated easily with a conventional photocopier.

However, modern duplication technologies are developing, and some fake labeling are too real to be identified with the naked eye. In addition, in most cases, an ordinary purchaser is unfamiliar with the authentic labeling, let alone the details thereof, and cannot distinguish fake labeling from the authentic labeling.

SUMMARY

Therefore, an object of the disclosure is to provide a system for verifying authenticity of a to-be-examined (TBE) anti-counterfeiting element that can alleviate at least one of the drawbacks of the prior art.

According to the disclosure, the system includes a model building module that includes a pre-processing sub-module and a training sub-module connected to the pre-processing sub-module, and a verifying module.

The pre-processing sub-module is configured to obtain a plurality of original images of a same reference anti-counterfeiting element, and is configured to substitute, with respect to each of the original images, make different adjustments to the original image to form a plurality of true-element-images, respectively. The plurality of true-element images formed with respect to a same one of the original images constitute a set.

The training sub-module is configured to train a deep neural network based on plural sets of the true-element-images to build a machine learning model that is related to the reference anti-counterfeiting element, wherein the plural sets of true-element images correspond respectively to the original images.

The verifying module is configured to obtain a TBE image of the TBE anti-counterfeiting element, and to input the TBE image into the machine learning model to determine whether the TBE anti-counterfeiting element in the TBE image is authentic or unauthentic.

Another object of the disclosure is to provide a method for building a machine learning model that is related to a reference anti-counterfeiting element for verifying authenticity of a to-be-examined (TBE) anti-counterfeiting element.

According to the disclosure, the method includes steps of:
receiving a plurality of original images of the reference anti-counterfeiting element;
with respect to each of the original images, making different adjustments to the original image to form a plurality of true-element-images, respectively, wherein the plurality of true-element images formed with respect to a same one of the original images constitute a set;
inputting plural sets of the true-element-images to a deep neural network, the plural sets of the true-element images corresponding respectively to the original images; and
training the deep neural network based on the plural sets of the true-element-images to build the machine learning model that is related to the reference anti-counterfeiting element.

The other object of the disclosure is to provide a method for verifying authenticity of a TBE anti-counterfeiting element.

According to the disclosure, the method includes steps of:
capturing, by an image capturing module, a plurality of TBE images of the TBE anti-counterfeiting element;
forwarding the TBE images to a verifying module;
for each of the TBE images, the verifying module inputting the TBE image into the machine learning model that is built according to the method for building a machine learning model described above, to determine whether the TBE anti-counterfeiting element in the TBE image is authentic or unauthentic.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
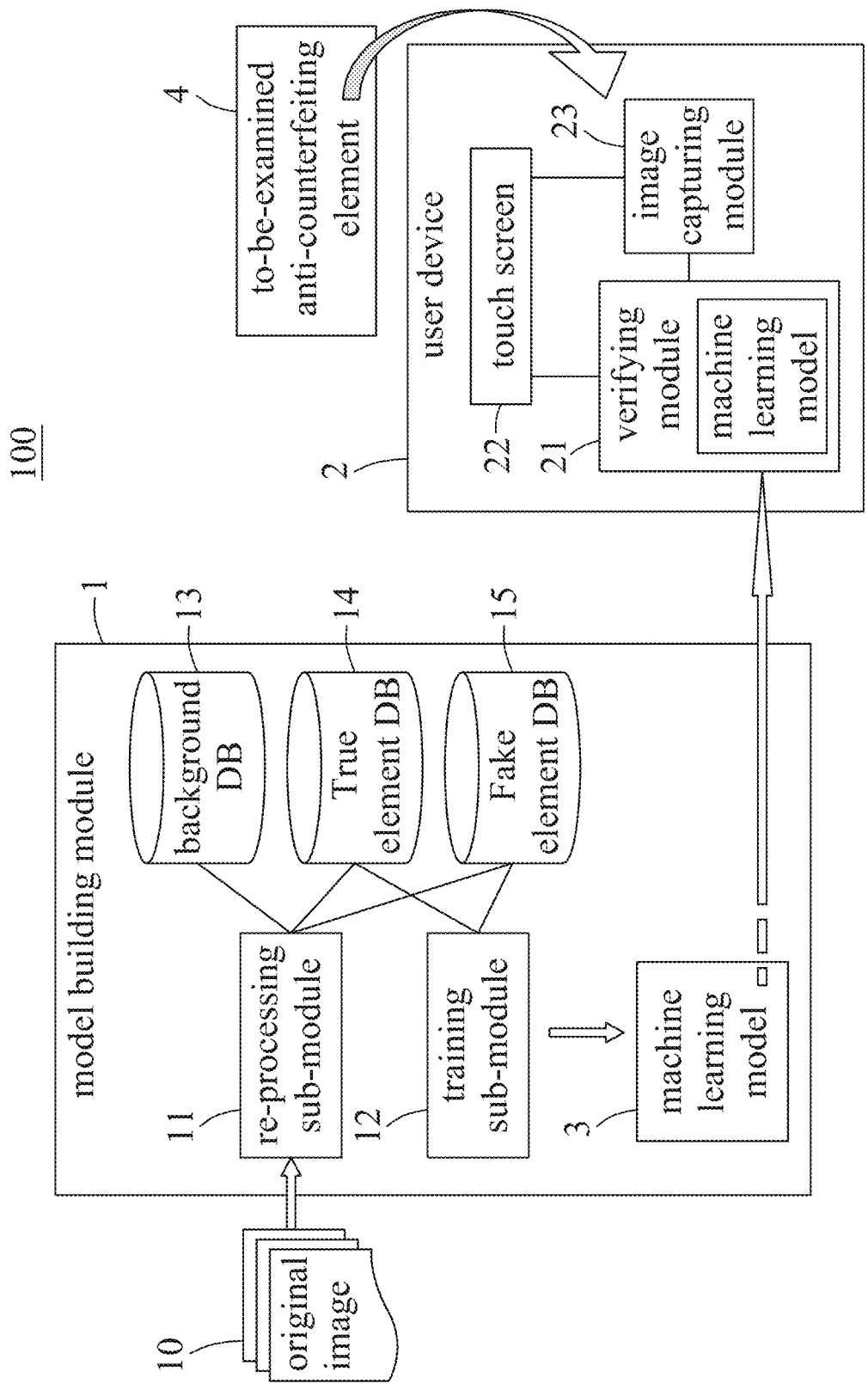
FIG. 1 is a block diagram of a system for verifying authenticity of a to-be-examined anti-counterfeiting element according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a system 100 for verifying a to-be-examined (TBE) anti-counterfeiting element 4 according to this disclosure includes a model building module 1 and a user device 2. The model building module 1 may be built in a server (not shown), and includes a pre-processing sub-module 11 and a training sub-module 12. The pre-processing sub-module 11 is configured to process received data, i.e., original images 10 of a same reference anti-counterfeiting element (not shown) in this embodiment. The training sub-module 12 is configured to train a deep neural network to build a machine learning model 3 that is related to the reference anti-counterfeiting element and that is used to verify authenticity of the TBE anti-counterfeiting element 4. The reference anti-counterfeiting element may be an authentic holographic security label, and the TBE anti-counterfeiting element 4 may be an unknown (unverified) holographic security label.

For example, some embodiments of the model building module 1 may be implemented in one or a combination of hardware, firmware and software. Other embodiments of the model building module 1 may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and/or other storage devices and media.

The user device 2 is used to verify authenticity of the TBE anti-counterfeiting element 4 in this embodiment. The user device 2 includes a touch screen 22 that generates instructions in response to touch operations and that serves as a display, an image capturing module 23 that is capable of capturing images, and a processor that serves as a verifying module 21. For example, the user device 2 may be a smart phone, a laptop, or a tablet computer, etc., and the image capturing module 23 may be a built-in camera of the user device 2. In this embodiment, the machine learning model 3 is downloaded from the model building module 1 to the user device 2, so that the user device 2 may perform verifying processes off-line. The verifying processes will be described in detail in the following.

Figure 2:
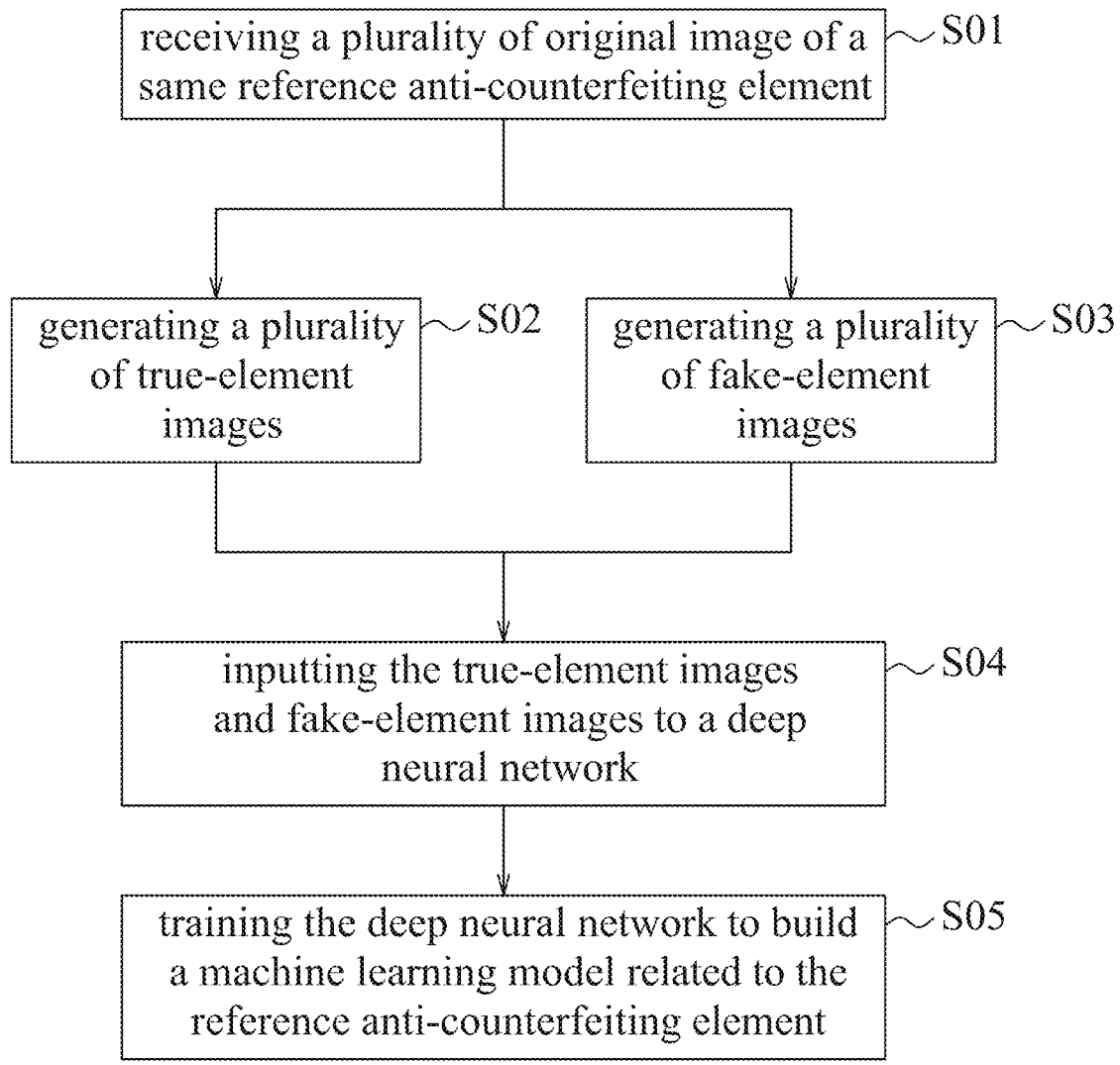
FIG. 2 is a flow chart illustrating an embodiment of a method for building a machine learning model that is related to a reference anti-counterfeiting element and used for verifying authenticity of a to-be-examined anti-counterfeiting element.

Further referring to FIG. 2, a method for building the machine learning model 3 that is related to the reference anti-counterfeiting element is performed by the model building module 1, and includes the following steps.

In step S01, the pre-processing sub-module 11 of the model building module 1 receives the original images 10 of the reference anti-counterfeiting element. The original images 10 may be provided by a client who intends to use the system 100 and may be pre-stored in a nonvolatile storage of the server (where the model building module 1 is built in) so that the model building module 1 can access the original images 10, or may be captured by a camera (not shown) and then transmitted to the model building module 1.

In step S02, with respect to each of the original images 10, the pre-processing sub-module 11 generates a plurality of true-element images that are associated with the reference anti-counterfeiting element and that have different backgrounds and/or lighting effects by making different adjustments to the original image 10. One way of generating the true-element images involves the pre-processing sub-module 11 first removing an original background of the original image 10 to make most of the content of the original image 10 about the reference anti-counterfeiting element, and then adding a new background in place of the original background. For example, the original image 10 may be a photograph of the reference anti-counterfeiting element that is adhered to a white box (i.e., the original image 10 contains the reference anti-counterfeiting element and a portion of the white box), in which case the pre-processing sub-module 11 cuts an outer part of the original image 10 other than the image of the reference anti-counterfeiting element (i.e., the original background) out of the original image 10. Specifically, the outer part is a peripheral part of the original image 10 that is part of the white box and that surrounds the reference anti-counterfeiting element in the original image 10.

In one implementation, the model building module 1 further includes a background database (DB) 13 that stores a plurality of environmental backgrounds. Since the reference anti-counterfeiting element may in reality be adhered to or printed on various kinds of products, the plurality of environmental backgrounds may be images of different boxes, apparel items, paper products, etc., in various colors. In this embodiment, the plurality of environmental backgrounds are pre-stored in the background database 13 of the model building module 1.

Another way of generating the true-element images involves the pre-processing sub-module 11 adding various lighting effects to the original image 10 with the original background.

It would be appreciated that these two ways may be combined, in which case a true-element image that corresponds to the original image 10 would be the original image 10 with a different background from the original background and applied with a specific lighting effect.

In this embodiment, with respect to each of the original images 10, the pre-processing sub-module 11 generates a subset of the plurality of true-element images by respectively adding these images of various boxes, apparel items, paper products in various colors (i.e., the environmental backgrounds) to the original image 10 as substitutes for the original background of the original image 10, with or without also adding lighting effects to the original image 10, and/or by adding various lighting effects to the original image which still have the original background. The pre-processing sub-module 11 further stores the plurality of true-element images in the model building module 1 to establish a true element database 14 in the model building module 1. In some embodiments, for verifying purpose, the plurality of true-element images may be classified into several groups, such as a first group for labels adhered to a white box, a second group for labels adhered to a black box, a third group for labels placed under a fluorescent lamp, etc.

In step S03, the pre-processing sub-module 11 generates a plurality of fake-element images that are associated with the reference anti-counterfeiting element, and stores the plurality of fake-element images in the model building module 1 to establish a fake element database 15 in the model building module 1.

The pre-processing sub-module 11 may generate the plurality of fake-element images based on the original images 10 or the true-element images by means of known fake image generators, such as tools like "dummyimage.com," "fakeimg.pl," with an URL, or by using a GAN (generative adversarial network) model. In other embodiments, the plurality of fake-element images may be provided by the client and the pre-processing sub-module 11 may simply obtain the plurality of fake-element images from the client. The plurality of fake-element images are related to counterfeit or unauthentic anti-counterfeiting elements, e.g., fake holographic security labels. For example, the pre-processing sub-module 11 may make alterations to the original images 10 or the true-element images to generate the plurality of fake-element images that serve as images of counterfeit or unauthentic anti-counterfeiting elements. The plurality fake-element images that are provided by the client may be photographs of counterfeit or unauthentic anti-counterfeiting elements. Similarly, in some embodiments, for verifying purposes, the plurality of fake-element images may be classified into several groups, such as a first group for labels adhered to a white box, a second group for labels adhered to a black box, a third group for labels placed under a fluorescent lamp, etc.

In practice, a number of the true-element images and a number of the fake-element images are extremely large and are much greater than a number of the original images 10.

In step S04, the training sub-module 12 accesses the true-element images and the fake-element images, and then inputs the same to a deep neural network. In this embodiment, the deep neural network may be, but not be limited to, a convolutional neural network (CNN, or (ConvNet).

In step S05, the training sub-module 12 trains the deep neural network based on the plurality of true-element images that are associated with the reference anti-counterfeiting element and the plurality of fake-element images that are associated with the reference anti-counterfeiting element, so as to build the machine learning model 3 that is related to the reference anti-counterfeiting element.

In other embodiments, the model building module 1 may further include an other-type database (not shown) including other-type images that cannot be recognized (e.g. images that are too dark, too bright or fuzzy, etc.). The training sub-module 12 may train the deep neural network further based on the images in the other-type database to build the machine learning model 3.

Figure 3:
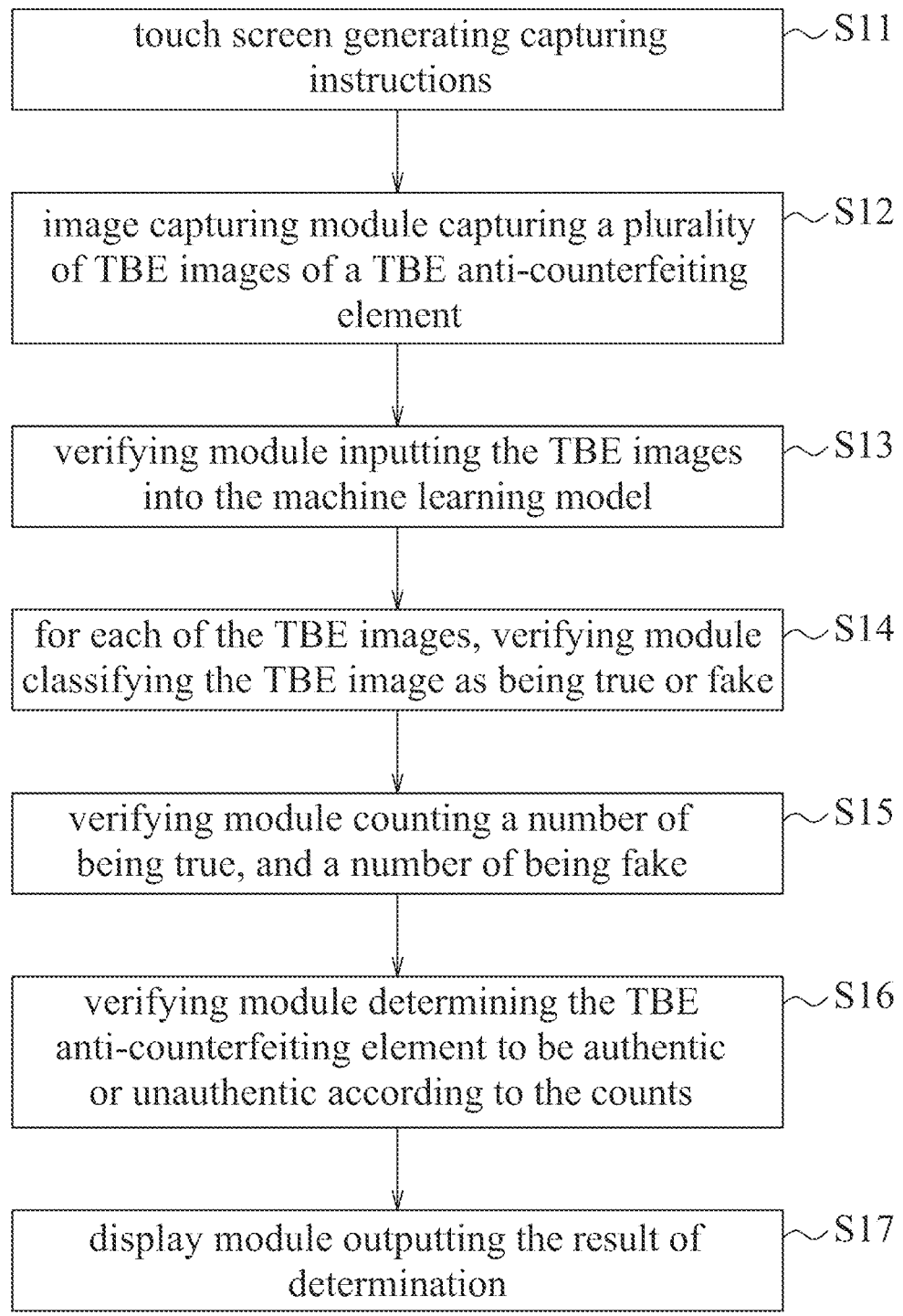
FIG. 3 is flow chart illustrating a method for verifying authenticity of a to-be-examined anti-counterfeiting element according to an embodiment of the disclosure.

Referring to FIG. 3, a method for verifying authenticity of the TBE anti-counterfeiting element 4 is performed by the user device 2, and includes the following steps.

Figure 4:
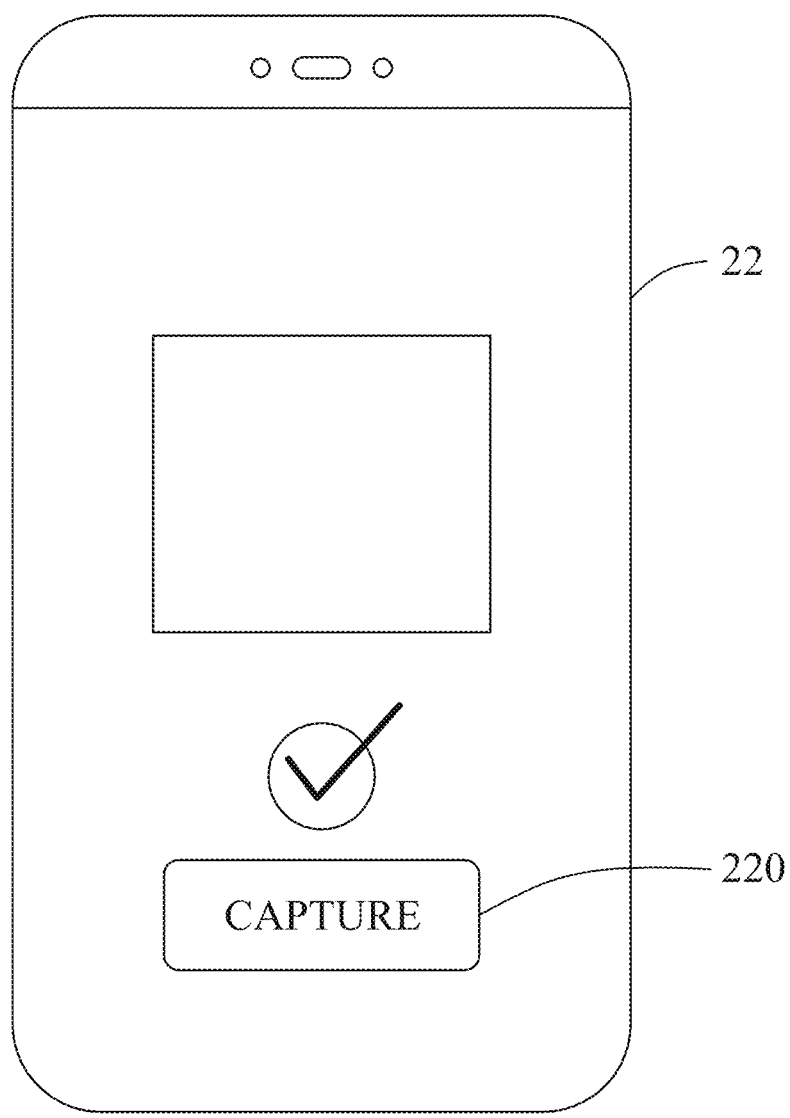
FIG. 4 is a schematic view of a user device showing an operation interface according to an embodiment of the disclosure.

In step S11, further referring to FIG. 4, the touch screen 22 generates a capturing instruction in response to a touch operation and transmits the capturing instruction to the image capturing module 23. Specifically, in this embodiment, a user who wants to verify the authenticity of the TBE anti-counterfeiting element 4 may hold the user device 2 in such a way that the image capturing module 23 focuses on the TBE anti-counterfeiting element 4, and then touch a capture button 220 shown on the touch screen 22 until an accomplish symbol is shown on the touch screen 22 (for example, holding the touch on the capture button 220 for one or two seconds); as a result, the touch screen 22 generates a series of capturing instructions in response to the touch-holding operation.

In step S12, the image capturing module 23 captures a plurality of to-be-examined (TBE) images of the TBE anti-counterfeiting element 4 respectively in response to the series of capturing instructions, and forwards the TBE images to the verifying module 21. Specifically, the image capturing module 23 captures one TBE image upon receiving one capturing instruction from the touch screen 22. Since the hand of the user would inevitably move slightly during the touch-holding operation, the TBE images may be slightly different from each other.

In step S13, the verifying module 21 inputs each of the TBE images into the machine learning model 3.

In step S14, for each of the TBE images, the verifying module 21 uses the machine learning model 3 to classify the TBE image as being true or fake (i.e., to determine whether the TBE anti-counterfeiting element 4 in the TBE image is authentic or unauthentic). In detail, for each of the TBE images, the verifying module 21 executes the machine learning model 3 to calculate a probability of being true which indicates that the TBE anti-counterfeiting element 4 in the TBE image is probably authentic, and a probability of being fake which indicates that the TBE anti-counterfeiting element 4 in the TBE image is probably unauthentic.

In more detail, the machine learning model 3 may be defined as two functions, i.e., one function of "True" and one function of "Fake." The function of "True" and the function of "Fake" are built and modified by the model building module 1, and are used respectively to obtain the probability of being true and the probability of being fake, for example, based on pixels of the TBE image. The verifying module 21 then classifies the TBE image as being true (i.e., the TBE anti-counterfeiting element 4 in the TBE image is authentic) when the probability of being true is greater than the probability of being fake, and classifies the TBE image as being fake (i.e., the TBE anti-counterfeiting element 4 in the TBE image is unauthentic) when otherwise.

In the case that the plurality of true-element images and the plurality of fake-element images are classified into the several groups, the machine learning model 3 may be defined as several functions, i.e., a function of "True_one," a function of "True_two," etc., and a function of "Fake_one," a function of "Fake_two," etc. In such case, the verifying module 21 classifies the TBE image as being true when the probability calculated by the function of "True_one" or "True_two" is the greatest among all probabilities, and classifies the TBE image as being fake when the probability calculated by the function of "Fake_one" or "Fake_two" is the greatest among all probabilities.

In step S15, after classification of all of the TBE images is completed, the verifying module 21 counts a number of members in a first subset of the TBE images that are classified as being true, and a number of members in a second subset of the TBE images that are classified as being fake. For example, the image capturing module 23, in response to the capturing instructions, captures seven TBE images of the TBE anti-counterfeiting element 4 in step S12, and the verifying module 21 classifies five of the TBE images as being true, meaning that the TBE anti-counterfeiting element 4 in each of said five of the TBE images is authentic and classifies the remaining two of the TBE images as being fake, meaning that the TBE anti-counterfeiting element 4 in each of the remaining two of the TBE images is unauthentic, so the number of members in the first subset of the TBE images is five and the number of members in the second subset of the TBE images is two.

In step S16, the verifying module 21 determines the TBE anti-counterfeiting element 4 to be authentic or unauthentic based on the numbers of members in the first and second subsets of the TBE images, and forwards a result of determination to a display module of the user device 2 (i.e., the touch screen 22 in this embodiment). Taking the exemplary counting result described above as an example, the verifying module 21 determines the TBE anti-counterfeiting element 4 to be authentic, since the number of members in the first subset of the TBE images is greater than the number of members in the second subset of the TBE images.

In step S17, the display module (touch screen 22) outputs the result of determination.

It is noted that, in the cases that the training sub-module 12 trains the deep neural network further based on the images in the other-type database to build the machine learning model 3, the verifying module 21 further classifies each of TBE image as being true, fake or indeterminate (i.e., determines whether the TBE anti-counterfeiting element 4 in each TBE image is authentic, unauthentic or unrecognized).

Figure 5:
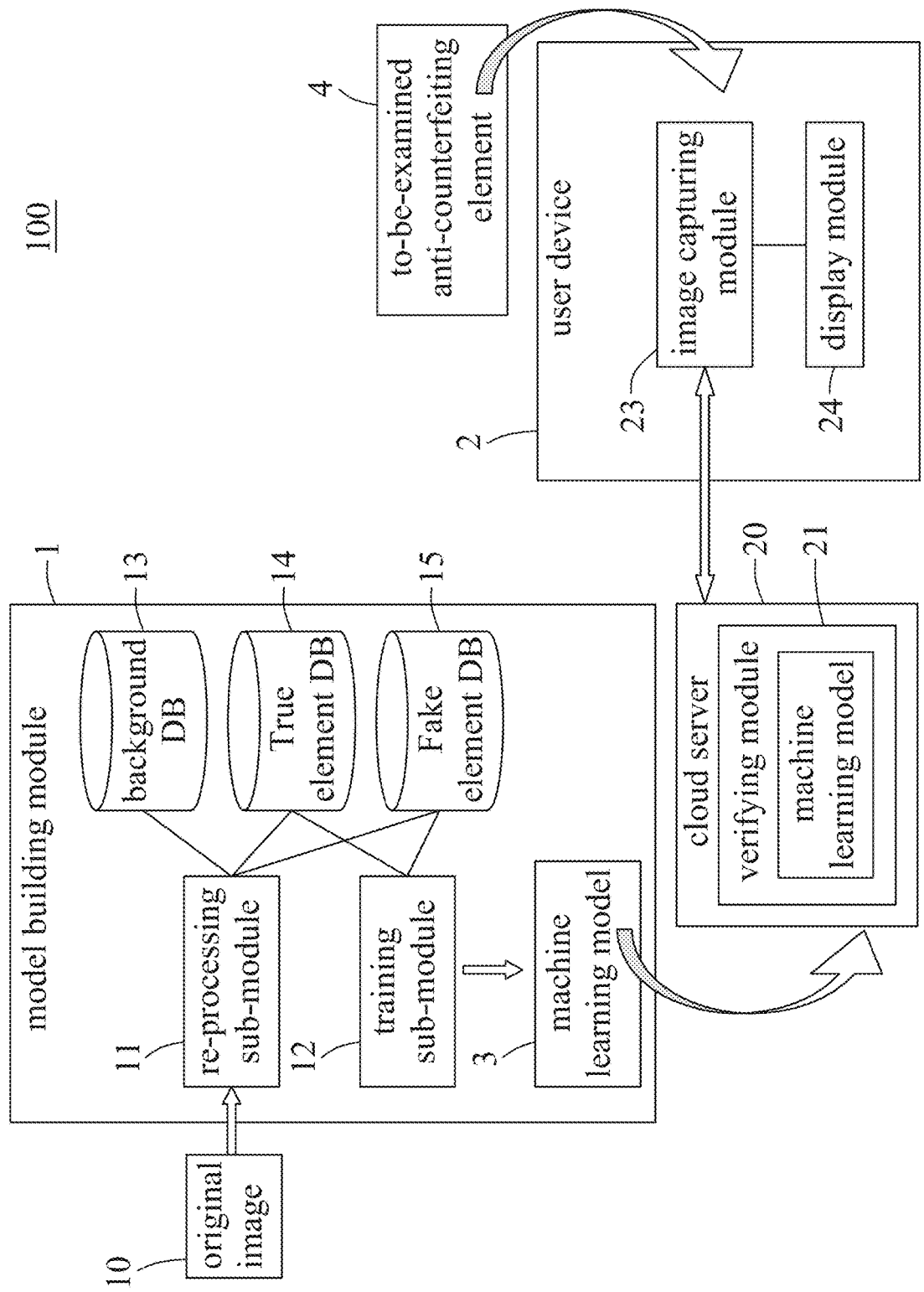
FIG. 5 is a block diagram of a system for verifying authenticity of a to-be-examined anti-counterfeiting element according to another embodiment of the disclosure.

Referring to FIG. 5, the verifying processes may be performed on a cloud server 20 rather than on the user device 2, and the verifying module 21 is included in the cloud server 20 (e.g., a processor of the cloud server 20). That is to say, the system 100 includes the model building module 1, the user device 2 and the cloud server 20.

The machine learning model 3 may be uploaded to the cloud server 20 after it is built. The machine learning model 3 may be trained again when the pre-processing sub-module 11 receives more original images of the reference anti-counterfeiting element, and the machine learning model which is uploaded to the cloud server 20 should be updated. In this embodiment, the user device 2 simply performs steps S11 and S12 of the method in FIG. 3. The image capturing module 23 transfers the TBE images to the cloud server 20 for the verifying module 21 to perform steps S13-S16. It is noted that, in some embodiments, the image capturing module 23 may be a camera that is placed in a store and captures photos of a product exhibited in the store (only performs step S12 of the method in FIG. 3), rather than a component of the user device.

After determining the TBE anti-counterfeiting element 4 to be authentic or unauthentic, the verifying module 21 transfers the result of determination to the user device 2 for a display module 24 of the user device 2 to output the result of determination (step S17).

In summary, the model building module 1 builds the machine learning model 3 related to the reference anti-counterfeiting element so that a user may use his/her user device 2 to determine whether the TBE anti-counterfeiting element 4 is authentic or not.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for building a machine learning model that is related to a reference anti-counterfeiting element for verifying authenticity of a to-be-examined anti-counterfeiting element, the method comprising steps of:
   receiving a plurality of original images of the reference anti-counterfeiting element;
   with respect to each of the original images, making different adjustments to the original image to form a plurality of true-element images, respectively, wherein the plurality of true-element images formed with respect to a same one of the original images constitute a set;
   inputting plural sets of the true-element images to a deep neural network, the plural sets of the true-element images corresponding respectively to the original images; and
   training the deep neural network based on the plural sets of the true-element images to build the machine learning model that is related to the reference anti-counterfeiting element;
   wherein the step of making different adjustments to the original image is to add different lighting effects to the original image so as to form the plurality of true-element images, respectively.

2. The method of claim 1, wherein the step of making different adjustments to the original image is to remove an original background of the original image and then add a plurality of pre-stored environmental backgrounds to the original image in place of the original background so as to form the plurality of true-element images, respectively.

3. The method of claim 1, further comprising:
   generating a plurality of fake-element images and inputting the plurality of fake-element images to the deep neural network; and
   training the deep neural network further based on the plurality of fake-element images so as to build the machine learning model related to the reference anti-counterfeiting element.

4. The method of claim 3, further comprising:
   inputting a plurality of other-type images that cannot be recognized to the deep neural network; and
   training the deep neural network further based on the plurality of other-type images so as to build the machine learning model related to the reference anti-counterfeiting element.

5. A method for verifying authenticity of a TBE anti-counterfeiting element, comprising steps of:
   capturing, by an image capturing module, a plurality of TBE images of the TBE anti-counterfeiting element;
   forwarding the TBE images to a verifying module;
   for each of the TBE images, the verifying module inputting the TBE image into the machine learning model that is built according to the method of claim 1 to determine whether the TBE anti-counterfeiting element in the TBE image is authentic or unauthentic.

6. The method of claim 5, further comprising steps of:
   the verifying module using the machine learning model to classify the TBE image as one of being true and being fake, and counting a number of being true and a number of being fake; and
   determining the TBE anti-counterfeiting element to be one of authentic and unauthentic according to the counts.

7. The method of claim 6, wherein the step of the verifying module using the machine learning model to classify the TBE image as one of being true and being fake includes:
   for each of the TBE images, the verifying module executing the machine learning model to calculate a probability of being true which indicates that the TBE anti-counterfeiting element in the TBE image is authentic and a probability of being fake which indicates that the TBE anti-counterfeiting element in the TBE image is unauthentic, and classifying the TBE image as being true when the probability of being true is greater than the probability of being fake, and to classify the TBE image as being fake when otherwise.

8. A system for verifying authenticity of a to-be-examined (TBE) anti-counterfeiting element, said system comprising:
a model building module, including
a pre-processing sub-module configured to obtain a plurality of original images of a same reference anti-counterfeiting element, and configured to, with respect to each of the original images, make different adjustments to the original image to form a plurality of true-element-images, respectively, wherein the plurality of true-element images formed with respect to a same one of the original images constitute a set, and
a training sub-module connected to said pre-processing sub-module, and configured to train a deep neural network based on plural sets of the true-element images to build a machine learning model that is related to the reference anti-counterfeiting element, the plural sets of true-element images corresponding respectively to the original images; and
a verifying module configured to obtain a TBE image of the TBE anti-counterfeiting element and to input the TBE image into said machine learning model to determine whether the TBE anti-counterfeiting element in the TBE image is authentic or unauthentic;
wherein said pre-processing sub-module of said model building module makes different adjustments to the original image by adding different lighting effects to the original image so as to form the plurality of true-element images, respectively.

9. The system of claim 8, wherein said pre-processing sub-module makes different adjustments to the original image by removing an original background of the original image and then adding a plurality of pre-stored environmental backgrounds to the original image in place of the original background so as to form the plurality of true-element images, respectively.

10. The system of claim 8, wherein said pre-processing sub-module is further configured to generate a plurality of fake-element images; and
said training sub-module is further configured to train the deep neural network based on the plurality of fake-element images, so as to build said machine learning model related to the reference anti-counterfeiting element.

11. The system of claim 10, wherein said training sub-module is further configured to train the deep neural network based on a plurality of other-type images that cannot be recognized, so as to build said machine learning model related to the reference anti-counterfeiting element.

12. The system of claim 10, further comprising:
an image capturing module configured to capture a plurality of TBE images of the TBE anti-counterfeiting element, and to forward the TBE images to said verifying module; and
wherein, for each of the TBE images, said verifying module uses said machine learning model to classify the TBE image as one of being true and being fake, counts a number of members in a first subset of the TBE images that are classified as being true and a number of members in a second subset of the TBE images that are classified as being fake, and finally determines whether the TBE anti-counterfeiting element is authentic or unauthentic according to the number of members in the first subset and the number of members in the second subset.

13. The system of claim 12, wherein said verifying module is configured to execute said machine learning model to calculate, for each of the TBE images, a probability of being true which indicates that the TBE anti-counterfeiting element in the TBE image is authentic and a probability of being fake which indicates that the TBE anti-counterfeiting element in the TBE image is unauthentic, to classify the TBE image as being true when the probability of being true is greater than the probability of being fake, and to classify the TBE image as being fake when otherwise.

14. The system of claim 12, further comprising:
a cloud server configured to communicate with said model building module, and including said verifying module; and
a user device configured to communicate with said cloud server, and including said image capturing module and a display module for outputting a result of determination of whether the TBE anti-counterfeiting element is authentic or unauthentic.

* * * * *